United States Patent
Beauvais et al.

(10) Patent No.: US 10,549,738 B2
(45) Date of Patent: Feb. 4, 2020

(54) VEHICLE BRAKE OPERATION

(71) Applicant: Ford Global Technologies, LLC, Dearborn, MI (US)

(72) Inventors: Brandon Beauvais, Dearborn, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/901,990

(22) Filed: Feb. 22, 2018

(65) Prior Publication Data

US 2019/0256069 A1    Aug. 22, 2019

(51) Int. Cl.
| | |
|---|---|
| *B60T 8/58* | (2006.01) |
| *B60T 7/04* | (2006.01) |
| *B60T 8/172* | (2006.01) |
| *B60T 8/72* | (2006.01) |
| *B60T 13/14* | (2006.01) |
| *B60T 13/66* | (2006.01) |
| *B60T 8/32* | (2006.01) |

(52) U.S. Cl.
CPC ............... *B60T 8/58* (2013.01); *B60T 7/042* (2013.01); *B60T 8/172* (2013.01); *B60T 8/3205* (2013.01); *B60T 8/72* (2013.01); *B60T 13/146* (2013.01); *B60T 13/662* (2013.01); *B60T 2220/04* (2013.01)

(58) Field of Classification Search
CPC . B60T 8/58; B60T 7/042; B60T 8/172; B60T 8/3205; B60T 8/72; B60T 13/146; B60T 13/662; B60T 2220/04
USPC ........ 303/154, 3, 10, 20, 113.1, 115.1, 116.1, 303/116.2, 122.09; 188/181 R, 180, 358; 701/70, 71, 76, 82
See application file for complete search history.

(56) References Cited

U.S. PATENT DOCUMENTS

| | | | | |
|---|---|---|---|---|
| 5,938,297 | A * | 8/1999 | Whaite | B60T 8/442 303/113.3 |
| 6,851,760 | B2 * | 2/2005 | Ishida | B60T 8/4275 303/11 |
| 9,126,570 | B2 * | 9/2015 | Joyce | B60T 7/042 |
| 2016/0252903 | A1 | 9/2016 | Prokhorov | |
| 2017/0052540 | A1 | 2/2017 | Lokesh | |
| 2017/0057520 | A1 | 3/2017 | Letwin et al. | |
| 2017/0227959 | A1 | 8/2017 | Lauffer et al. | |
| 2018/0354474 | A1 * | 12/2018 | Zhang | B60T 7/12 |

FOREIGN PATENT DOCUMENTS

JP    H10305764 A    11/1998

* cited by examiner

*Primary Examiner* — Pamela Rodriguez
(74) *Attorney, Agent, or Firm* — Frank A. MacKenzie; Bejin Bieneman PLC

(57) ABSTRACT

A system includes a computer including a processor and a memory, the memory storing instructions executable by the processor to actuate a vehicle brake according to a specified brake torque, receive user input to exceed the specified brake torque, and actuate a brake fluid valve to attain a brake fluid pressure to maintain the specified brake torque.

20 Claims, 4 Drawing Sheets

VEHICLE BRAKE OPERATION

BACKGROUND

Vehicles include brakes to slow and stop the vehicles. The brakes can output a brake torque to slow vehicle wheels. In an autonomous vehicle, a vehicle user and a vehicle computer can provide input to actuate the brake. The input from the vehicle user and the vehicle computer may increase the brake torque applied to the vehicle wheels. However, problems arise when both the vehicle user and the vehicle computer provide input to actuate the brake.

DETAILED DESCRIPTION

Figure 1:
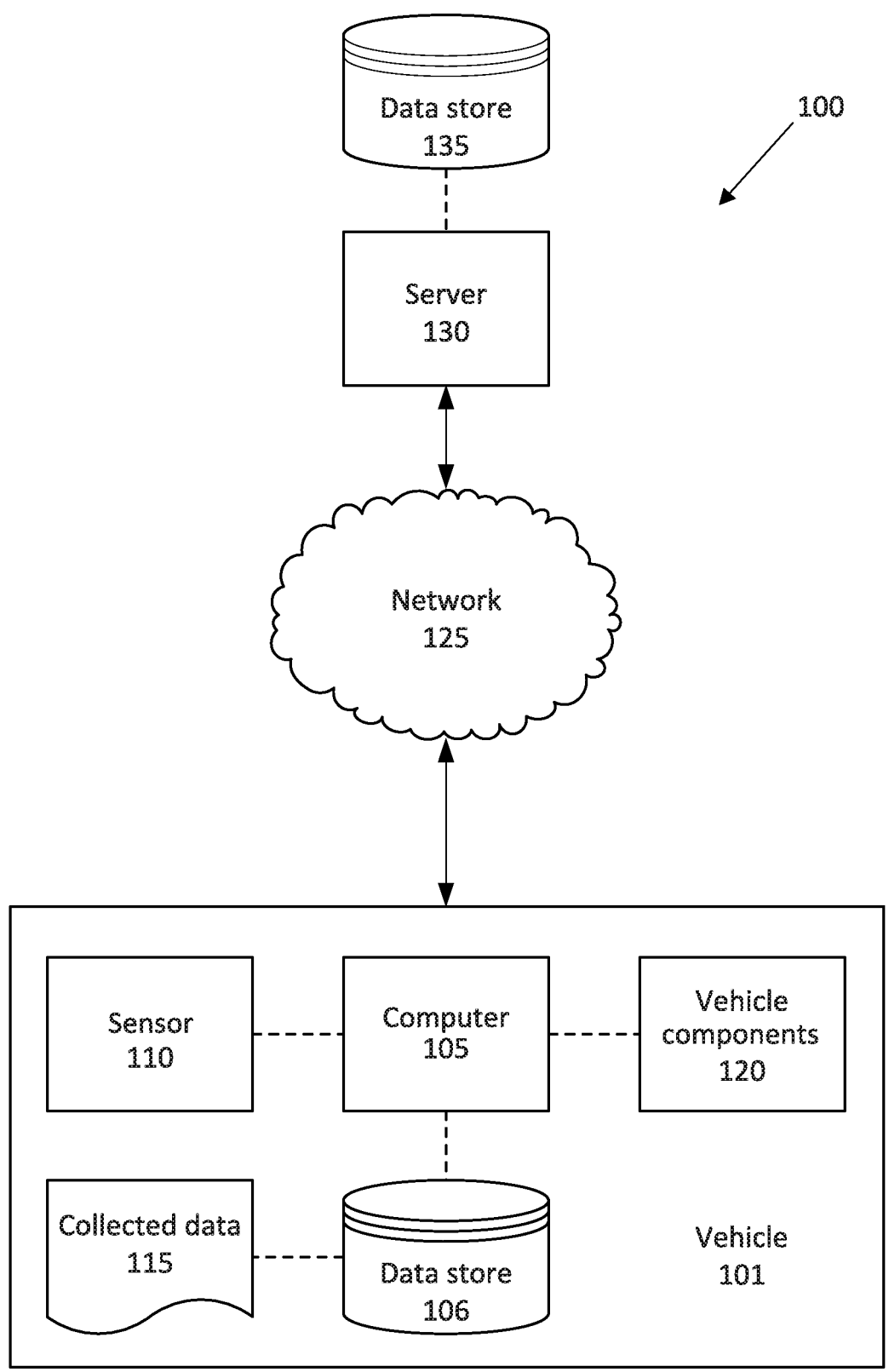
FIG. 1 is a block diagram of an example system for braking a vehicle.

A system includes a computer including a processor and a memory, the memory storing instructions executable by the processor to actuate a vehicle brake according to a specified brake torque, receive user input to exceed the specified brake torque, and actuate a brake fluid valve to attain a brake fluid pressure to maintain the specified brake torque.

The instructions can further include instructions to actuate a brake fluid pump to attain the brake fluid pressure to maintain the specified brake torque.

The instructions further can include instructions to identify the user input based on data of at least one of a vehicle acceleration, the brake torque, and the brake fluid pressure.

The instructions can further include instructions to actuate the brake fluid valve to connect a brake cylinder to a fluid reservoir.

The instructions can further include instructions to actuate the brake fluid valve to isolate a brake cylinder from the brake.

The instructions can further include instructions to actuate the brake fluid valve when a vehicle acceleration exceeds an acceleration threshold.

The instructions can further include instructions to actuate the brake valve in a periodic shutter to reduce the brake fluid pressure.

The instructions can further include instructions to open the brake fluid valve upon receiving user input to a brake pedal, to close the brake fluid valve after a predetermined period of time, to determine a current brake fluid pressure, and to open the brake fluid valve when the current brake fluid pressure is greater than a specified brake fluid pressure to maintain the specified brake torque.

The instructions can further include instructions to identify the user input to a brake pedal based on data collected from a brake pedal angle sensor.

A vehicle brake system includes a brake pedal, a brake fluid pump, a brake fluid valve in communication with the brake pedal, means for actuating the brake fluid pump according to a specified brake torque, means for receiving user input exceeding the specified brake torque, and means for actuating the brake fluid valve to attain a brake fluid pressure to maintain the specified brake torque upon receiving user input.

The system can further include means for identifying the user input based on data of at least one of a vehicle acceleration, the brake torque, and the brake fluid pressure.

The system can further include means for actuating the brake fluid valve to connect a brake cylinder to a fluid reservoir.

The system can further include means for actuating the brake fluid valve to isolate a brake cylinder from the brake fluid pump.

The system can further include means for opening the brake fluid valve upon receiving user input to the brake pedal, means for closing the brake fluid valve after a predetermined period of time, means for determining a current brake fluid pressure, and means for opening the brake fluid valve when the current brake fluid pressure is greater than a specified brake fluid pressure to output the specified brake torque.

A method includes actuating a vehicle brake according to a specified brake torque, receiving user input to exceed the specified brake torque, and actuating a brake fluid valve to attain a brake fluid pressure to maintain the specified brake torque.

The method can further include actuating a brake fluid pump to attain the brake fluid pressure to maintain the specified brake torque.

The method can further include identifying the user input based on data of at least one of a vehicle acceleration, the brake torque, and the brake fluid pressure.

The method can further include actuating the brake fluid valve to connect a brake cylinder to a fluid reservoir.

The method can further include actuating the brake fluid valve to isolate a brake cylinder from the brake.

The method can further include opening the brake fluid valve upon receiving user input to a brake pedal, closing the brake fluid valve after a predetermined period of time, determining a current brake fluid pressure, and opening the brake fluid valve when the current brake fluid pressure is greater than a specified brake fluid pressure to output the specified brake torque.

Further disclosed is a computer programmed to execute any of the above method steps. Yet further disclosed is a vehicle comprising the computer. Yet further disclosed is a computer program product, comprising a computer readable medium storing instructions executable by a computer processor, to execute any of the above method steps.

In an autonomous vehicle, a vehicle computer can operate a vehicle brake without user input. However, when a user provides input to a brake pedal, a brake torque can exceed a specified brake torque determined by the computer to brake the vehicle. To mitigate the increased brake torque from the user input, the computer can actuate one or more brake fluid valves to direct brake fluid into a fluid reservoir until a specified brake fluid pressure to achieve the specified brake torque is reached. Thus, the computer can actuate the brake and provide complete and/or partial control of the brake even when the user provides input to the brake.

FIG. 1 illustrates an example system 100 for braking a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
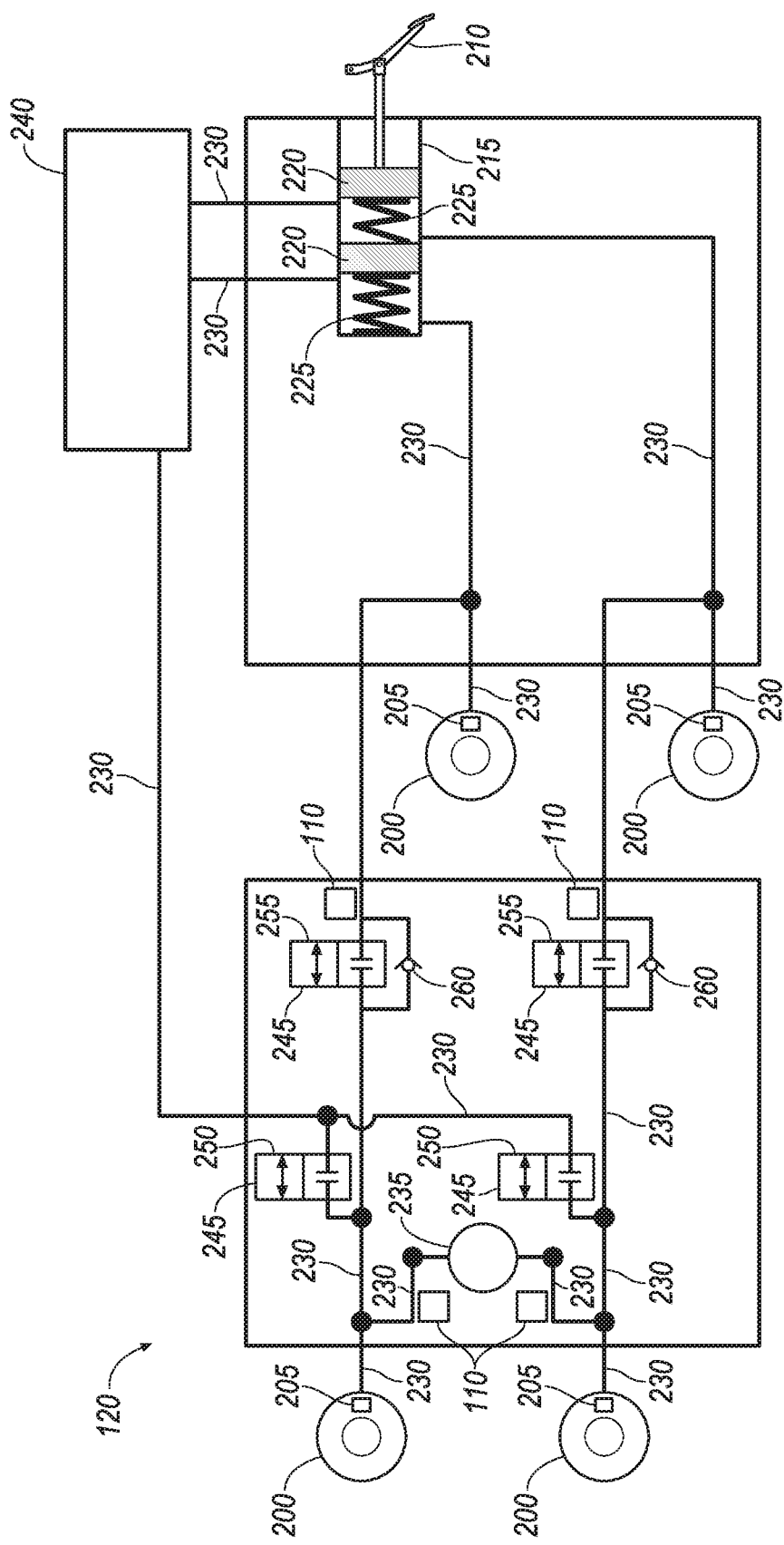
FIG. 2 illustrates an example brake.

FIG. 2 illustrates an example brake 120 in a vehicle 101. The vehicle 101 includes a plurality of wheels 200. The wheels allow the vehicle 101 to move along a roadway. A propulsion 120 rotates the wheels 200, propelling the vehicle 101, and the brake 120 slows rotation of the wheels 200, slowing and stopping the vehicle 101. The brake 120 can include brake pads 205 on at least one of the wheels 200 that generate friction on the wheels 200, slowing rotation of the wheels 200.

The example brake 120 includes a brake pedal 210. The brake pedal 210 receives user input to actuate the brake 120. As described below, the user can depress the brake pedal 210 to slow and stop the vehicle 101. When the computer 105 operates the vehicle 101 in the fully autonomous mode, the computer 105 can actuate the brake 120 without user input to the brake pedal 210. Thus, when the user provides input to the brake pedal 210 and the vehicle 101 is in the autonomous mode, the computer 105 can actuate portions of the brake 120 to account for the user input.

The example brake 120 includes a brake cylinder 215. The brake cylinder 215 is attached to the brake pedal 210. The brake cylinder includes brake fluid. When the user provides input to the brake pedal 210, the brake cylinder 215 moves from a first position, shown in FIG. 2, to a second position, shown in FIG. 3. The brake cylinder 215 includes a piston 220 and a spring 225. The piston 220 is connected to the brake pedal 210. When the user depresses the brake pedal 210, the piston 220 coils the spring 225, pushing brake fluid from the brake cylinder 215. When the user releases the brake pedal 210, the spring 225 uncoils, pushing the piston 220 and drawing brake fluid into the brake cylinder 215.

The example brake 120 includes a plurality of fluid lines 230. The fluid lines 230 allow brake fluid to move to the brake pads 205, slowing rotation of the wheels. The fluid lines 230 can be, e.g., tubes that connect parts of the brake 120, e.g., the fluid lines 230 can connect the brake cylinder 215 to a fluid reservoir 240. The fluid lines 230 can be constructed of a flexible material, e.g., a plastic, a metal mesh, etc., and/or the fluid lines 230 can be constructed from a rigid material, e.g., a metal, a ceramic, etc.

The example brake 120 includes a brake fluid pump 235. The brake fluid pump 235 moves brake fluid through the fluid lines 230 to the brake pads 205, slowing rotation of the wheels 200. The computer 105 can actuate the brake fluid pump 235 to stop the vehicle 101. The brake fluid pump 235 can include a motor (not shown) and a piston (not shown). The computer 105 can actuate the motor to move the piston, pumping brake fluid through the fluid lines 230 to the brake pads 205. The computer 105 can actuate the brake fluid pump 235 to attain a specified brake fluid pressure to maintain a specified brake torque to brake at least one of the wheels 200. As described below, the specified brake fluid pressure can be a brake fluid pressure determined to output a specific brake torque on the wheels 200.

The example brake 120 includes a fluid reservoir 240. The fluid reservoir 240 stores brake fluid used in the brake 120. The fluid reservoir 240 is connected to the fluid lines 230. The brake 120 can require a different volume of brake fluid based on whether the user actuates the brake pedal 210 and/or the computer 105 actuates the brake fluid pump 235 to slow rotation of the wheels 200. Excess brake fluid can be stored in the fluid reservoir 240 when not needed, and brake fluid can move from the fluid reservoir 240 to the brake pads 205, the brake cylinder 215, and/or the brake fluid pump 235 when needed.

The example brake 120 includes a plurality of brake fluid valves 245. The brake fluid valves 245 open and close the fluid lines 230, allowing the brake fluid to move through the fluid lines 230 to specific parts of the brake 120. The brake fluid valves 245 are movable from an open position to a closed position. In the open position, indicated in FIGS. 2-3 by the arrows in the brake fluid valve 245, the brake fluid valve 245 allows fluid to pass through the fluid line. In the closed position, indicated in FIGS. 2-3 as the parallel lines with a gap in between in the brake fluid valve 245, the brake fluid valve 245 prevents brake fluid from passing through the fluid line 230. The computer 105 can actuate the brake fluid valves 245 to attain a specified brake fluid pressure to maintain a specified brake torque, e.g., determined based on Equation 1 below.

The brake fluid valves 245 can include at least one dump valve 250. The "dump" valve 250 connects fluid lines 230 to connect the brake cylinder 215 to the fluid reservoir 240. When the dump valve 250 is in the open position, brake fluid moves from the brake cylinder 215 to the fluid reservoir 240 without reaching the brake pads 205. The computer 105 can determine to open the dump valves 250 to prevent brake fluid moving from the brake cylinder 215 to the brake pads 205. Thus, when the computer 105 determines that actuation of the brake cylinder 215 should not increase braking of the wheels, the computer 105 can open the dump valves 250 to direct brake fluid from the brake cylinder 215 to the fluid reservoir 240.

The brake fluid valves 245 can include at least one isolation valve 255. The "isolation" valve 255 connects fluid lines 230 to connect the brake cylinder 215 to the brake pads 205. When the isolation valve 255 is in the open position, brake fluid can move from the brake cylinder 215 to the brake pads 205. When the isolation valve 255 is in the closed position, brake fluid is stopped from moving from the brake cylinder 215 to the brake pads 205. The computer 105 can determine to close the isolation valves 255 to prevent brake fluid moving from the brake cylinder 215 to the brake pads 205, i.e., to isolate the brake cylinder 215. The isolation valve 255 can include a check valve 260, i.e., a one-way valve that allows brake fluid to move from the brake cylinder 215 to the brake pads 205 when a brake fluid pressure exceeds a predetermined threshold based on, e.g., a pressure rating of the check valve 260. That is, even when the isolation valve 255 is in the closed position, when the brake fluid pressure exceeds the predetermined threshold, brake fluid can move through the check valve 260 to the brake pads 205.

The example brake 120 includes at least one pressure sensor 110, e.g., a manometer, a piezoresistive strain gauge, a variable capacitor, etc. The pressure sensor 110 can determine the brake fluid pressure in the fluid lines 230. The computer 105 can actuate the pressor sensor 110 to collect pressure data 115 and to determine the brake fluid pressure. Based on the data 115 from the pressure sensor 110 indicating the brake fluid pressure, the computer 105 can actuate the brake fluid valves 245 and the brake fluid pump 235 to adjust the brake fluid pressure to a specified brake fluid pressure.

The computer 105 can determine a brake torque. The brake torque is a torque applied to the wheels 200 to slow the wheels 200, braking the vehicle 101. The brake torque can be determined based on brake fluid pressure data 115:

$$\tau = 2\mu r p A \tag{1}$$

where $\tau$ is the brake torque, $\mu$ is a coefficient of friction between a brake pad 205 and a wheel 200, r is a radius of one of the wheels 200, A is an area of contact between one of the brake pads 205 and the respective wheel 200, and p is the brake fluid pressure. Because $\mu$, r, A are fixed values for each vehicle 101, the brake torque $\tau$ changes only when the brake fluid pressure p changes. Thus, to output a specific brake torque $\tau$, the computer 105 can determine a specified brake fluid pressure p with Equation 1 and actuate the brake fluid pump 235 to attain the specified brake fluid pressure.

The example brake 120 can include at least one acceleration sensor 110. The computer 105 can actuate the acceleration sensor 110 to determine an acceleration of the vehicle 101. The computer 105 can determine a specified acceleration to brake the vehicle 101, and the computer 105 can determine the specified brake torque to attain the specified acceleration:

$$a = \frac{\tau}{r \cdot m_v} \tag{2}$$

where a is the specified acceleration and $m_v$ is the mass of the vehicle 101. The computer 105 can determine the specified acceleration based on, e.g., a distance between the vehicle 101 and an object, a current vehicle 101 speed, etc. When the computer 105 actuates the brake 120, the computer 105 can collect acceleration data 115 to determine whether the specified brake torque produces the specified acceleration to slow and stop the vehicle 101.

Figure 3:
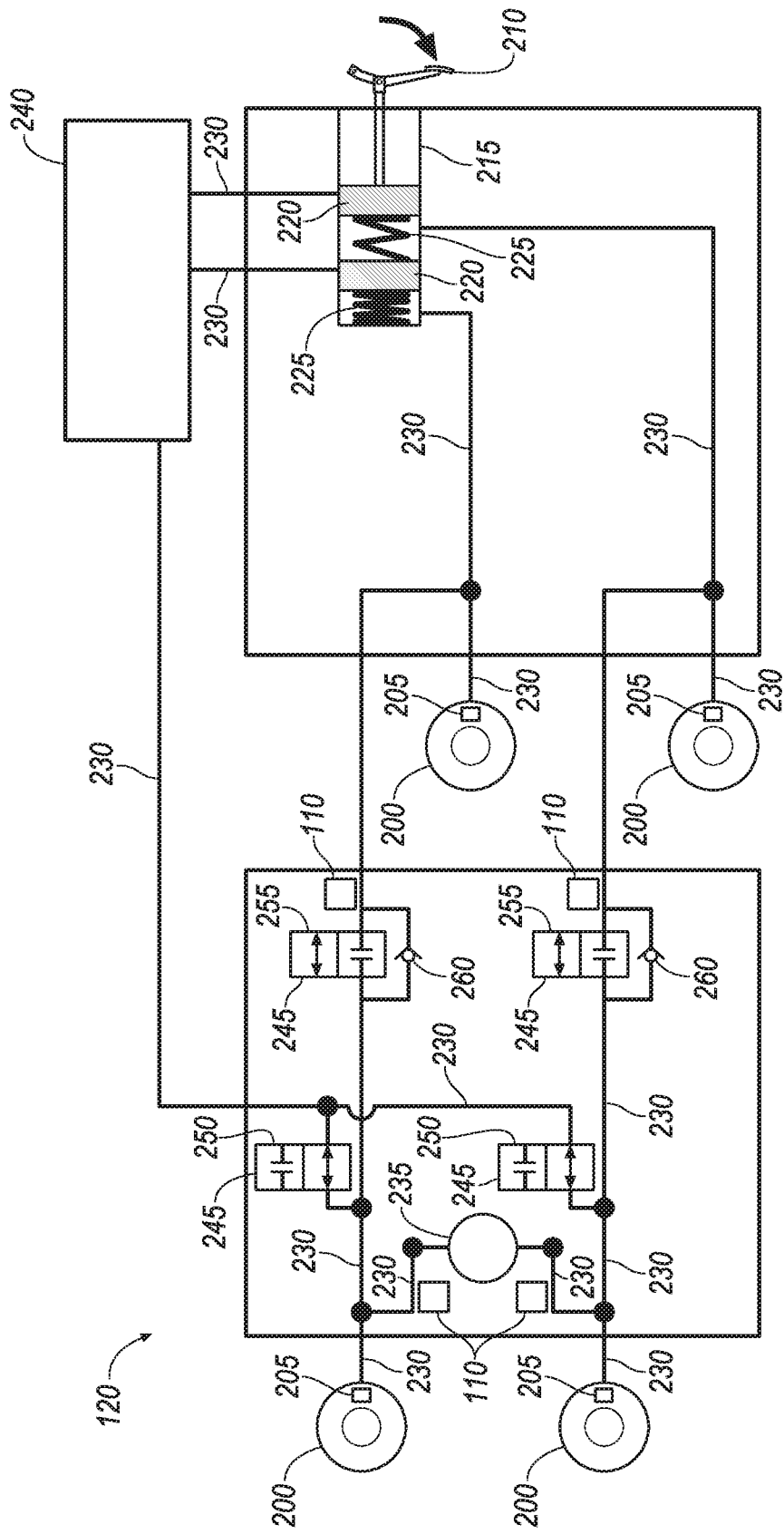
FIG. 3 illustrates the example brake of FIG. 2 receiving input to a brake pedal.

FIG. 3 illustrates the example brake 120 when a vehicle 101 user provides input to the brake pedal 210. The computer 105 can actuate the brake fluid pump 235 to generate a specified brake fluid pressure to maintain a specified brake torque. When the user applies the brake pedal 210, brake fluid from the brake cylinder 215 can enter the fluid lines 230, increasing the brake fluid pressure beyond the specified brake fluid pressure, thus increasing the brake torque.

The computer 105 can detect user input to the brake pedal 210. The computer 105 can actuate a pressure sensor 110 to collect pressure data 115. The computer 105 can determine a brake fluid pressure based on the pressure data 115. When the brake fluid pressure exceeds the specified brake fluid pressure, the computer 105 can determine that the user has provided input to the brake pedal 210.

The computer 105 can actuate an acceleration sensor 110 to collect acceleration data 115. The computer 105 can determine a vehicle 101 acceleration based on the acceleration data 115. When the acceleration exceeds a specified acceleration, the computer 105 can determine that the user has provided input to the brake pedal 210. The specified acceleration can be, e.g., an acceleration determined to slow the vehicle 101 to a speed of an object in front of the vehicle 101.

The computer 105 can actuate a brake pedal 210 angle sensor 110 to collect brake pedal 210 angle data 115. The brake pedal 210 angle sensor 110 can be, e.g., a potentiometer that outputs a specific voltage based on rotation of a dial on the potentiometer, a magnetoresistive element that measures an orientation of a magnetic field, a rotary encoder, etc. The computer 105 can determine a brake pedal 210 angle from the brake pedal 210 angle data 115. The brake pedal 210 can define an angle between the first position of the brake pedal 210 and a current position of the brake pedal 210 measured by movement of the brake pedal 210 angle sensor 110, e.g., based on rotation of the dial on the potentiometer. When the brake pedal 210 angle exceeds a brake pedal 210 angle threshold (e.g., determined based on empirical data 115 of users providing input to brake pedals), the computer 105 can determine that the user has provided input to the brake pedal 210.

The computer 105 can determine a brake torque based on collected data 115 from the sensors 110 and at least one of the equations described above. When the brake torque exceeds the specified brake torque, the computer 105 can determine that the user has provided input to the brake pedal 210. The computer 105 can then determine to relieve the brake fluid pressure to maintain the specified brake torque.

To relieve the brake fluid pressure, the computer 105 can actuate the dump valves 250 to allow brake fluid to move into the fluid reservoir 240. The computer 105 can actuate the dump valves 250 to the open position, connecting the fluid lines 230 between the brake cylinder 215 and the fluid reservoir 240. The computer 105 can actuate the dump valves 250 until the brake fluid pressure reduces to maintain the specified brake torque.

The computer 105 can actuate the dump valve 250 in a "periodic shutter" mode. In the periodic shutter mode, the computer 105 opens and closes the dump valve 250 a plurality of times in succession, reducing the brake fluid pressure more slowly than opening the dump valve 250 and maintaining the dump valve 250 in the open position. Furthermore, operating the dump valve 250 in the periodic shutter mode can prevent sudden changes to the brake fluid pressure by slowly reducing the brake fluid pressure, preventing sudden changes to the brake torque and acceleration of the vehicle 101. For example, the computer 105 can actuate the dump valves in a similar timing to an anti-lock brake system. In another example, the computer 105 can instruct the dump valve 250 to move between the open and closed positions at a specified rate, e.g., 15 movements per second, where one "movement" is includes one opening and one closing of the dump valve 250.

The computer 105 can actuate the pressure sensors 110 to determine the brake fluid pressure and actuate the dump valves 250 in the periodic shutter mode based on the brake fluid pressure data 115. The computer 105 can compare the brake fluid pressure data 115 to the specified brake fluid pressure to maintain the specified brake torque. When the brake fluid pressure data 115 indicate that the brake fluid pressure is greater than the specified brake fluid pressure, the computer 105 can actuate the dump valves 250 in the periodic shutter mode. When the brake fluid pressure data 115 indicate that the brake fluid pressure is below the specified brake fluid pressure (or within a predetermined pressure threshold, e.g., based on empirical testing data, of the specified brake fluid pressure), the computer 105 can actuate the dump valves 250 to the closed position.

The computer 105 can actuate the dump valve 250 in the periodic shutter mode for a specified period of time to reduce the brake fluid pressure. Based on the length of the fluid lines 230, the amount of brake fluid moving from the brake cylinder 215, and the operation of the brake fluid pump 235, the brake fluid pressure can change with a hysteresis effect upon actuation of the dump valves 250. That is, upon opening the dump valves 250, the brake fluid pressure may not begin to reduce immediately as the brake fluid moves through the dump valves 250 into the fluid reservoir 240. Furthermore, upon closing the dump valves 250, the brake fluid pressure may continue to reduce as the brake fluid moves from the dump valves 250 into the fluid reservoir before stabilizing. Thus, to reduce the brake fluid pressure to the specified brake fluid pressure and to maintain the specified brake fluid pressure, the computer 105 can actuate the dump valve 250 in the periodic shutter mode for a predetermined period of time, close the dump valve 250, wait for a second predetermined period of time based on an empirically determined length of the hysteresis effect, and then collect brake fluid pressure data 115 from the pressure sensor 110 once the brake fluid pressure no longer continues to reduce. The computer 105 can then actuate the dump valve 250 when the brake fluid pressure data 115 indicate that the brake fluid pressure is still above the specified brake fluid pressure.

Figure 4:
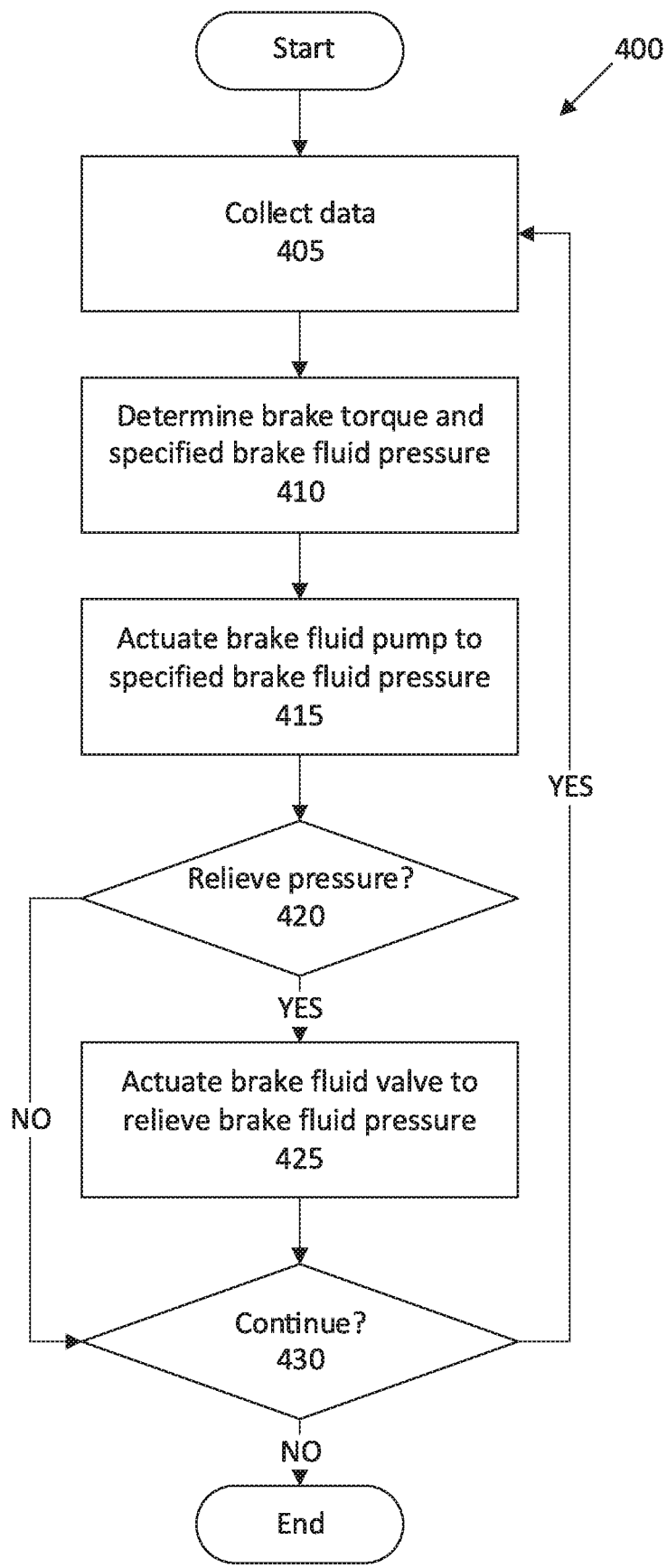
FIG. 4 is a block diagram of an example process for braking the vehicle.

FIG. 4 illustrates an example process 400 for operating the vehicle 101. The process 400 begins in a block 405, in which the computer 105 actuates one or more sensors 110 to collect data 115. The computer 105 can actuate, e.g., the pressure sensors 110 to determine a brake fluid pressure, ultrasonic and/or radar and/or lidar sensors 110 to detect nearby objects that can require braking, etc.

Next, in a block 410, the computer 105 determines a specified brake torque and a specified brake fluid pressure to attain the specified brake torque, e.g., using the relationship shown in Equation 1 above. The computer 105, upon determining to actuate the brake 120, can determine a specified brake torque to brake the vehicle 101, as described above. The computer 105 can determine a specified brake fluid pressure to output the specified brake torque.

Next, in a block 415, the computer 105 actuates the brake fluid pump 235 to output the specified brake fluid pressure. The computer 105 can actuate a motor in the brake fluid pump 235 to move a piston to change a brake fluid pressure in fluid lines 230 to generate the specified brake fluid pressure. The computer 105 can collect data 115 from the pressure sensors 110 to determine when the brake fluid pressure is within a pressure threshold of the specified brake fluid pressure.

Next, in a block 420, the computer 105 determines whether to relieve the brake fluid pressure. The computer 105 can collect data 115 from the pressure sensors 110 to determine the brake fluid pressure. When the brake fluid pressure exceeds the specified brake fluid pressure, as described above, the computer 105 can determine to relieve the brake fluid pressure. For example, if a vehicle 101 user depresses the brake pedal 210, brake fluid from a brake cylinder can increase the brake fluid pressure, increasing the brake torque above the specified brake torque. The computer 105 can relieve the brake fluid pressure to reduce the brake torque to the specified brake torque. If the computer 105 determines to relieve the brake fluid pressure, the process 400 continues in a block 425. Otherwise, the process 400 continues in a block 430.

In the block 425, the computer 105 actuates one or more brake fluid valves 245 to relieve the brake fluid pressure. As described above, the computer 105 can actuate one or more dump valves 250 to allow brake fluid to move from the brake cylinder 215 to the fluid reservoir 240, reducing the brake fluid pressure. The computer 105 can actuate the dump valves 250 in a periodic shutter mode, i.e., opening the closing the dump valves 250 in succession to reduce the brake fluid pressure more slowly than maintaining the dump valves 250 in the open position.

In the block 430, the computer 105 determines whether to continue the process 400. The computer 105 can determine to continue the process 400 to determine whether the brake fluid pressure remains above the specified brake fluid pressure. As described above, the brake fluid pressure can have a hysteresis effect, and the brake fluid pressure can reduce over a period of time longer than a response time of the pressure sensors 110. Thus, the computer 105 can continue the process 400 until the brake fluid pressure stabilizes to the specified brake fluid pressure. If the computer 105 determines to continue, the process 400 returns to the block 405 to collect more data 115. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   specify a brake torque to attain a specified vehicle acceleration;
   actuate a vehicle brake according to the specified brake torque;
   then, receive user input to exceed the specified brake torque; and
   actuate a brake fluid valve to attain a brake fluid pressure to maintain the specified brake torque.

2. The system of claim 1, wherein the instructions further include instructions to actuate a brake fluid pump to attain the brake fluid pressure to maintain the specified brake torque.

3. The system of claim 1, wherein the instructions further include instructions to identify the user input based on data of at least one of a vehicle acceleration, the brake torque, and the brake fluid pressure.

4. The system of claim 1, wherein the instructions further include instructions to actuate the brake fluid valve to connect a brake cylinder to a fluid reservoir.

5. The system of claim 1, wherein the instructions further include instructions to actuate the brake fluid valve to isolate a brake cylinder from the brake.

6. The system of claim 1, wherein the instructions further include instructions to actuate the brake fluid valve when a vehicle acceleration exceeds an acceleration threshold.

7. The system of claim 1, wherein the instructions further include instructions to actuate the brake fluid valve in a periodic shutter to reduce the brake fluid pressure.

8. The system of claim 1, wherein the instructions further include instructions to open the brake fluid valve upon receiving user input to a brake pedal, to close the brake fluid valve after a predetermined period of time, to determine a current brake fluid pressure, and to open the brake fluid valve when the current brake fluid pressure is greater than a specified brake fluid pressure to maintain the specified brake torque.

9. The system of claim 1, wherein the instructions further include instructions to identify the user input to a brake pedal based on data collected from a brake pedal angle sensor.

10. A vehicle brake system, comprising:
a brake pedal;
a brake fluid pump;
a brake fluid valve in communication with the brake pedal;
means for specifying a brake torque to attain a specified vehicle acceleration;
means for actuating the brake fluid pump according to the specified brake torque;
means for receiving user input exceeding the specified brake torque; and
means for actuating the brake fluid valve to attain a brake fluid pressure to maintain the specified brake torque upon receiving user input.

11. The system of claim 10, further comprising means for identifying the user input based on data of at least one of a vehicle acceleration, the brake torque, and the brake fluid pressure.

12. The system of claim 10, further comprising means for actuating the brake fluid valve to connect a brake cylinder to a fluid reservoir.

13. The system of claim 10, further comprising means for actuating the brake fluid valve to isolate a brake cylinder from the brake fluid pump.

14. The system of claim 10, further comprising means for opening the brake fluid valve upon receiving user input to the brake pedal, means for closing the brake fluid valve after a predetermined period of time, means for determining a current brake fluid pressure, and means for opening the brake fluid valve when the current brake fluid pressure is greater than a specified brake fluid pressure to output the specified brake torque.

15. A method, comprising:
specifying a brake torque to attain a specified vehicle acceleration;
actuating a vehicle brake according to the specified brake torque;
then, receiving user input to exceed the specified brake torque; and
actuating a brake fluid valve to attain a brake fluid pressure to maintain the specified brake torque.

16. The method of claim 15, further comprising actuating a brake fluid pump to attain the brake fluid pressure to maintain the specified brake torque.

17. The method of claim 15, further comprising identifying the user input based on data of at least one of a vehicle acceleration, the brake torque, and the brake fluid pressure.

18. The method of claim 15, further comprising actuating the brake fluid valve to connect a brake cylinder to a fluid reservoir.

19. The method of claim 15, further comprising actuating the brake fluid valve to isolate a brake cylinder from the brake.

20. The method of claim 15, further comprising opening the brake fluid valve upon receiving user input to a brake pedal, closing the brake fluid valve after a predetermined period of time, determining a current brake fluid pressure, and opening the brake fluid valve when the current brake fluid pressure is greater than a specified brake fluid pressure to output the specified brake torque.

* * * * *